No. 624,923. Patented May 16, 1899.
J. GORDON.
GLASS FACING TILE.
(Application filed Aug. 20, 1898.)
(No Model.)
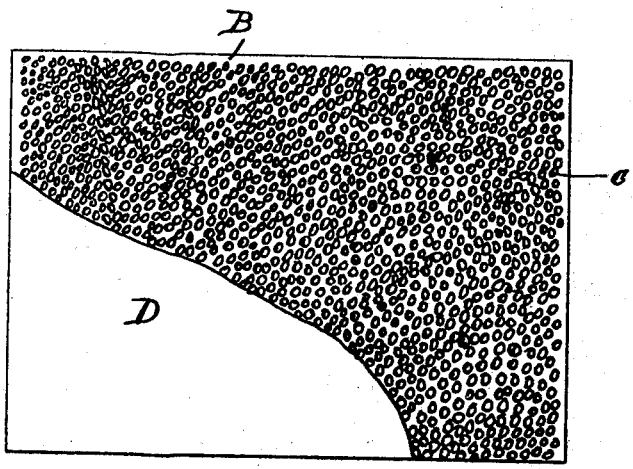
FIG. 1.
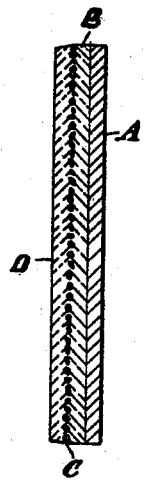
FIG. 2.
Witnesses:
Inventor:
John Gordon
By 
his Attorneys.

UNITED STATES PATENT OFFICE.

JOHN GORDON, OF LONDON, ENGLAND.

GLASS FACING-TILE.

SPECIFICATION forming part of Letters Patent No. 624,923, dated May 16, 1899.

Application filed August 20, 1898. Serial No. 689,078. (No model.)

*To all whom it may concern:*

Be it known that I, JOHN GORDON, a subject of the Queen of Great Britain and Ireland, residing at London, England, have invented a new and useful Improved Glass Facing-Tile, (for which I have made application for Letters Patent in Great Britain under No. 28,253, bearing date February 3, 1898,) of which the following is a specification.

This invention relates to the manufacture of an improved facing-tile of smooth glass, which is thereby adapted for the covering of walls or the faces of any brick, masonry, or other structure and which is impervious to moisture and sufficiently elastic to resist the cracking of the glass tile by the difference of the ratios of expansion under heat of glass and cement, reducing the transmission of vibration from wall to tiles and preventing the detaching effect of any climatic changes or of the bulging or subsidence of the structure, while at the same time it is cheaper in first cost than ordinary tiles or glazed bricks.

It is convenient and economical to employ Portland or other similar cement for the purpose of fixing tiles; but smooth glass tiles will not adhere with any security when fixed with cement, and if prepared with under keying-surfaces direct upon the glass, and glass is apt to crack and to detach in broken pieces from the cement backing, probably due to the vibration in the ratio of expansion by heat and contraction by cold between glass and cement or to the intense communication of vibration from the structure to the glass. To effect this desideratum, I prepare the under side of the glass tiles with a special compound backing which adheres firmly to the smooth glass, is waterproof, elastic, is not affected by climatic changes, and at the same time presents a face to ordinary cement capable of not only keying therewith and of firmly adhering thereto, but affords an elastic medium between the keying (which is bedded in the backing of cement) and the glass of the tile.

In order that this invention may be the better understood, I will now proceed to describe the same with reference to the drawings hereto annexed, and to the letters marked thereon.

Figure 1 is a view of the back, and Fig. 2 is a section of my improved glass tile.

A is the glass tile.

B is the first backing of asphalt mastic. C are particles of coarse sand embedded therein, forming a receptive and adherent surface for moist cement, mortar, or plaster, and D the tile, being then ready for application.

To prepare the tiles, the glass is heated to about 300° Fahrenheit and a thin layer of a special asphalt composition when plastic or molten is applied to them. The special asphalt composition or mastic I employ is composed of seventy-five per cent. of rock asphalt, such as that of the Val de Travers, and twenty-five per cent. of best Trinidad bitumen, such composition firmly adhering to the back of the said smooth glass tiles and having valuable properties, such as being absolutely waterproof and sufficiently refractory to resist any ordinary climatic changes of temperature without becoming soft or brittle or allowing the tiles to be detached. I then apply coarse silicious sand, heated to at least 300° Fahrenheit, by spreading it over the surface of the said composition backing of the tiles. Such sand is caused to become firmly embedded into and to engage with the said composition and affords a roughened surface which will key into and also firmly adhere to moist cement or even to mortar or plaster, which, being spread over the prepared back of the tile, renders the same ready for application to any wall or surface. The compound backing for the glass tiles thus prepared and applied has several advantages. It is cheaper and more economical than a complete facing and backing upon the wall or supporting-surface of an asphaltic composition alone, the adherence of the glass plates is very perfect, and the intermediate backing of my asphaltic composition renders the facing waterproof and permits a certain amount of elastic movement to the tiles, preventing splitting or cracking off of the tiles by the action of climatic changes or by the bulging or settling of the wall or structure.

Having now described my invention, what I claim, and desire to secure by Letters Patent, is—

1. A process for the manufacture of a facing-tile of smooth glass consisting of the heating of the glass to about 300° Fahrenheit; the application thereto of an asphalt mastic, not becoming molten at less than 300° Fahrenheit, in a plastic or molten condition of the said mastic; the spreading on the said mastic, and the embedding thereinto, while still molten, of coarse silicious sand, previously heated to about 300° Fahrenheit; thus assuring firm adherence of the glass to the mastic backing, and providing a keying-surface to the latter, adherent to cement or the like, while an elastic medium is interposed between the keying substance and the glass, substantially as described.

2. A glass facing-tile having in combination a smooth glass face, a backing thereto of an elastic asphalt mastic, not appreciably softened under solar temperatures, nor becoming brittle under frost and an embedded layer thereon of coarse silicious sand, forming a keying to cement or mortar, while the said keying is elastically connected to the glass facing to protect the latter from cracking or detachment.

3. A facing-tile of glass having in combination a smooth glass face, a backing thereto of an elastic refractory asphalt mastic, consisting of seventy-five per cent. of rock asphalt mixed with twenty-five per cent. of best Trinidad bitumen, and an embedded layer thereon of coarse silicious sand, substantially as and for the purposes hereinabove described.

It witness whereof I have hereunto set my hand in presence of two witnesses.

JOHN GORDON.

Witnesses:
LINDSAY RALFE CASEY,
CHARLES THOMAS YOUNG.